United States Patent
Koerner et al.

(10) Patent No.: US 12,445,040 B2
(45) Date of Patent: Oct. 14, 2025

(54) BIDIRECTIONAL POWER CONVERTER HAVING INTERMEDIATE CIRCUIT

(71) Applicant: Hella GmbH & Co. KGaA, Lippstadt (DE)

(72) Inventors: André Koerner, Lippstadt (DE); Martin Dierkes, Paderborn (DE); Christian Buhlheller, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 231 days.

(21) Appl. No.: 17/711,732

(22) Filed: Apr. 1, 2022

(65) Prior Publication Data

US 2022/0224250 A1    Jul. 14, 2022

Related U.S. Application Data

(63) Continuation of application No. PCT/EP2020/073216, filed on Aug. 19, 2020.

(30) Foreign Application Priority Data

Oct. 2, 2019   (DE) ............... 10 2019 126 571.1

(51) Int. Cl.
   *H02M 1/10*   (2006.01)
   *H02M 7/217*  (2006.01)
   (Continued)

(52) U.S. Cl.
   CPC ........... *H02M 1/10* (2013.01); *H02M 7/2173* (2013.01); *H02J 7/02* (2013.01); *H02J 2207/20* (2020.01); *H02M 1/15* (2013.01); *H02M 7/797* (2013.01)

(58) Field of Classification Search
   CPC .......... H02J 3/322; H02J 7/02; H02J 2207/20; H02M 1/007; H02M 1/10; H02M 1/15;
   (Continued)

(56) References Cited

U.S. PATENT DOCUMENTS

| | | |
|---|---|---|
| 11,251,625 B2 | 2/2022 | Sun et al. |
| 2008/0298103 A1 | 12/2008 | Bendre et al. |

(Continued)

FOREIGN PATENT DOCUMENTS

| | | |
|---|---|---|
| CN | 109861357 A | 6/2019 |
| EP | 2479868 A1 | 7/2012 |
| EP | 3621174 A1 | 3/2020 |

OTHER PUBLICATIONS

International Search Report dated Oct. 27, 2020 in corresponding application PCT/EP2020/073216.

*Primary Examiner* — Fred E Finch, III
(74) *Attorney, Agent, or Firm* — Muncy, Geissler, Olds & Lowe, P.C.

(57) ABSTRACT

A power converter including a three-phase alternating current input and output, a first power converter stage having a first input and output and a second input and output, an intermediate circuit, a second power converter stage having a first input and output and a second input and output and a direct current input and output, wherein the first input and output of the first power converter stage is electrically connected to the three-phase alternating current input and output, and the second input and output of the first power converter stage is electrically connected to the intermediate circuit.

3 Claims, 12 Drawing Sheets

(51) Int. Cl.
  *H02J 7/02* (2016.01)
  *H02M 1/15* (2006.01)
  *H02M 7/797* (2006.01)

(58) Field of Classification Search
  CPC .... H02M 7/217; H02M 7/2173; H02M 7/797;
  Y02T 10/70; Y02T 10/7072
  See application file for complete search history.

(56) References Cited

U.S. PATENT DOCUMENTS

| | | | |
|---|---|---|---|
| 2011/0261591 A1* | 10/2011 | Krause | H02M 7/219 |
| | | | 363/17 |
| 2016/0236580 A1* | 8/2016 | Hou | B60L 58/20 |
| 2020/0083727 A1* | 3/2020 | Sun | H02M 7/797 |
| 2020/0321796 A1* | 10/2020 | Chang | H02M 1/10 |
| 2021/0245613 A1* | 8/2021 | Millet | H02M 7/797 |
| 2022/0021293 A1* | 1/2022 | Esmoris Bertoa | H02M 1/10 |
| 2022/0038025 A1* | 2/2022 | Liu | B60L 53/22 |

* cited by examiner

BIDIRECTIONAL POWER CONVERTER HAVING INTERMEDIATE CIRCUIT

This nonprovisional application is a continuation of International Application No. PCT/EP2020/073216, which was filed on Aug. 19, 2020, and which claims priority to German Patent Application No. 10 2019 126 571.1, which was filed in Germany on Oct. 2, 2019, and which are both herein incorporated by reference.

BACKGROUND OF THE INVENTION

Field of the Invention

The present invention relates to a transformerless power converter including a three-phase alternating current input and output, a first power converter stage having a first input and output and a second input and output, an intermediate circuit, a second power converter stage having a first input and output and a second input and output and a direct current input and output, the first input and output of the first power converter state being electrically connected to the three-phase alternating current input and output, and the second input and output of the second power converter stage being electrically connected to the intermediate circuit, the first input and output of the second power converter stage being electrically connected to the intermediate circuit, and the second input and output of the second power converter stage being electrically connected to the direct current input and output, the first power converter stage being a controlled six-pulse bridge circuit made up of controllable power converter valves arranged in half-bridges, the intermediate circuit including a capacitor half-bridge, i.e., a first capacitor and a second capacitor, the first capacitor being connected to a first connection of the second input and output of the first power converter stage and to a first connection of the first input and output of the second power converter stage, on the one hand, and to the second capacitor, on the other hand, the second capacitor being connected to a second connection of the second input and output of the first power converter stage and to a second connection of the first input and output of the second power converter stage, on the one hand, and to the first capacitor, on the other hand, the connecting point between the first capacitor and the second capacitor being connected to a neutral conductor connection of the three-phase alternating current input and output.

The invention further relates to a method for rectifying two-phase current from a two-phase alternating current source with the aid of the transformerless power converter, the power converter being connected to the two-phase alternating current source via a second outer conductor and a third outer conductor connection of the three-phase alternating current input and output; and a method for rectifying single-phase current from a single-phase alternating current source with the aid of the transformerless power converter, the power converter being connected to the single-phase alternating current source via a third outer conductor connection of the three-phase alternating current input and output.

Description of the Background Art

With the aid of the first power converter stage of the transformerless power converter, a direct voltage is generated from a single-phase, a two-phase or a three-phase current, which is supplied to the second power converter stage via the intermediate circuit. With the aid of the second power converter stage, the direct voltage of the intermediate circuit may be set to the voltage which is to be present at the direct current input and output of the power converter.

Power converters are used in charging devices for electric vehicles. Known transformerless power converters for charging electric vehicles on single-phase alternating current grids, two-phase alternating current grids or three-phase alternating current grids currently require a large number of power electronic stages, so that charging devices for universal use on single-, two- or three-phase alternating current grids are expensive. There is therefore demand for a cost-effective and compact charging device for electric vehicles. Compensating currents which may flow into the vehicle due to parasitic leakage capacitances of the battery or other components need to be suppressed so as not to adversely influence the functioning of protective equipment against electrical hazard for people. Circuit parts required for single- or multiphase operation should be used in different functions, depending on the operating mode, in order to minimize the complexity for the charging device.

SUMMARY OF THE INVENTION

It is therefore an object of the present invention to provide a power converter that has a first half-bridge made up of controlled power converter valves, which is connected to the first connection and the second connection of the output of the first power converter stage, and the connecting point between the power converter valves of the first power converter valve half-bridge is connected to the connecting point of the capacitor half-bridge via a first inductor. The voltage over the first and/or second capacitor of the capacitor half-bridge of the intermediate circuit may be regulated with the aid of this first power converter valve half-bridge. Leakage currents in the vehicle may be avoided thereby when charged on a single-or two-phase alternating current grid with the aid of the three-phase rectifier. The regulation ensures that the voltage over the first capacitor and the voltage over the second capacitor are the same.

The circuit complexity may be reduced if the first power converter valve half-bridge is formed by a first of the half-bridges of the controlled six-pulse bridge circuit. It is then not necessary to provide special power converter valves only for the purpose of the invention. The existing infrastructure of the controlled six-pulse bridge circuit may be used.

If the first power converter valve half-bridge can be formed by a first of the half-bridges of the controlled six-pulse bridge circuit, it is advantageous if the power converter includes a first switch, which may be used to switch back and forth between an operation on a three-phase alternating current source and a source having fewer phases.

In a first variant, the first switch may be a changeover switch, whose shared middle connection is connected to the connecting point of the first power converter valve half-bridge and which, depending on the switch position, is connected to either the first inductor or possibly to a first outer conductor connection of the three-phase alternating current input and output via a further inductor.

In a second variant, the first switch may also be a changeover switch, whose shared middle connection is connected to the connecting point of the first power converter valve half-bridge via the first inductor and which, depending on the switch position, is connected to either the connecting point of the capacitor half-bridge or to a first outer conductor connection of the three-phase alternating current input and output.

In a third variant, the first switch may be an on/off switch, which connects a first outer conductor connection of the three-phase alternating current input and output to the connecting point of the capacitor half-bridge, the first outer conductor connection being connected to the first input and output of the controlled six-pulse bridge circuit via the first inductor.

Other variants are possible. In each variant, a conductive connection from the connecting point of the first power converter valve half-bridge to the first outer conductor connection of the three-phase alternating current input and output should be established by the first switch in the case of a supply on a three-phase alternating current source, in order to also supply the power converter with current from the first outer conductor connection, while a conductive connection from the connecting point of the first power converter valve half-bridge to the connecting point of the capacitor half-bridge via the inductor exists, due to the first switch, in the case of a supply on a single-phase or two-phase alternating current source, so that the power converter valves of the first power converter valve half-bridge may be used to regulate a voltage over the second capacitor of the capacitor half-bridge, in particular keep it constant, by a control of the first power converter stage. Due to the constant voltage over the second capacitor, a constant voltage is present at the connecting point of the capacitor half-bridge, which is connected to the neutral conductor. This makes it possible to avoid output ripple currents. Since the neutral conductor may be connected to the PE connection of the vehicle and a charging station or charging column on the side of the alternating current input and output, impermissible reactive currents due to parasitic capacitances of the vehicle may thus be avoided.

The quality of the current at the direct current input and output of the power converter when charging on a single-phase alternating current grid may be further improved if the power converter includes a second half-bridge made up of two controlled power converter valves, which is connected to the first connection and the second connection of the second input and output of the first power converter stage, and whose connecting point between the two controlled power converter valves is connected to the second connection of the second input and output of the first power converter stage via a series circuit made up of a second inductor and a third capacitor. With the aid of this second power converter valve half-bridge, the voltage over the capacitor half-bridge of the intermediate circuit may be regulated, in particular held constant. Ripples in the current at the direct current output of the power converter may be avoided thereby, if the three-phase rectifier is used for charging on a single-phase alternating current grid.

It is possible that the second power converter valve half-bridge is operated as an active ripple filter, using the third capacitor as a storage capacitor.

The power converter may be operated not only as a rectifier but also as an inverter. In particular, an operation as a single-phase inverter or as a three-phase inverter is possible. The second power converter stage may then be operated as a direct current converter, in particular as a step-up converter, which supplies the intermediate circuit with a voltage. This voltage is converted by the first power converter stage operated as an inverter into an alternating voltage. The first power converter stage, i.e., the controlled six-pulse bridge circuit, may be line-commutated or self-commutated, in particular in isolated operation, thus forming a grid. Even in the case of an inverter mode, it is necessary to both keep the power factor constant and prevent leakage currents due to voltage ripples via parasitic capacitances. Even in inverter mode, the voltage ripples over the capacitor half-bridge of the intermediate circuit may therefore be avoided in single-phase mode. The voltage ripples may be avoided using the same means as in rectifier mode.

The circuit complexity may be reduced if the second power converter valve half-bridge is formed by a second of the half-bridges of the controlled six-pulse bridge circuit. It is then not necessary to provide special power converter valves only for the purpose of the invention. The existing infrastructure of the controlled six-pulse bridge circuit may be used.

If the second power converter valve half-bridge is formed by the second of the half-bridges of the controlled six-pulse bridge circuit, it is advantageous if the power converter includes a second switch, which may be used to switch back and forth between an operation on a three- or two-phase alternating current source and a source having one phase.

In a first variant, the second switch may be a changeover switch, whose shared middle connection is connected to the connecting point of the second power converter valve half-bridge and which, depending on the switch position, is connected to the second inductor or possibly to a second outer conductor connection of the three-phase alternating current input and output via a further inductor.

In a second variant, the second switch may be a changeover switch, whose shared middle connection is connected to the connecting point of the second power converter valve half-bridge via the second inductor and which, depending on the switch position, is connected to either the third capacitor or a second outer conductor connection of the three-phase alternating current input and output.

In a third variant, it is furthermore possible that the second switch is an on/off switch, which connects a second outer conductor connection of the three-phase alternating current input and output to the third capacitor, the second outer conductor connection being connected to the first input and output of the controlled six-pulse bridge circuit via the second throttle inductor.

Further variants also exist for the design of the second switch and the integration into the power converter. In each variant, a conductive connection from the connecting point of the second power converter valve half-bridge to the second outer conductor connection of the three-phase alternating current input and output should be able to be established by the second switch in the case of a supply on a three-phase alternating current source, in order to also supply the power converter with current via the second outer conductor connection, while a conductive connection from the connecting point of the second power converter valve half-bridge to the connecting point of the second connection of the second input and output of the first power converter stage via the series circuit made up of the second inductor and the third capacitor exists, due to the first switch, in the case of a supply on a single-phase alternating current source, so that the power converter valves of the first power converter valve half-bridge may be used to regulate a voltage in the intermediate circuit by a control of the first power converter stage.

The second power converter stage may be a DC-DC converter, in particular, a synchronous converter.

The second power converter stage may comprise at least one power converter valve half-bridge made up of two power converter valves, a first of the two power converters being connected to the first connection and the second of the two power converters to the second connection of the first input and output of the second power converter stage, on the one hand, and both power converters being connected to a connecting point between the two power converters, on the other hand. The connecting point and the second connection of the first input and output may be connected to the second input and output of the second power converter stage via a low pass. If the second power converter stage includes two power converter valve half-bridges of this type, the capacitors of the low-pass filter may be combined into one component.

The power converter valves used in the invention may be transistors, power transistors, thyristors, IGBTs, FETs, MOSFETs, or the like.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5a shows a variant of the power converter from FIG. 4a; and

DETAILED DESCRIPTION

The drawings each show a power converter including an intermediate circuit, which has a capacitor half-bridge and a first power converter valve half-bridge, for regulating the voltage at a connecting point of the capacitor half-bridge, and which has a second power converter valve half-bridge for regulating a voltage in the intermediate circuit.

Figure 1A:
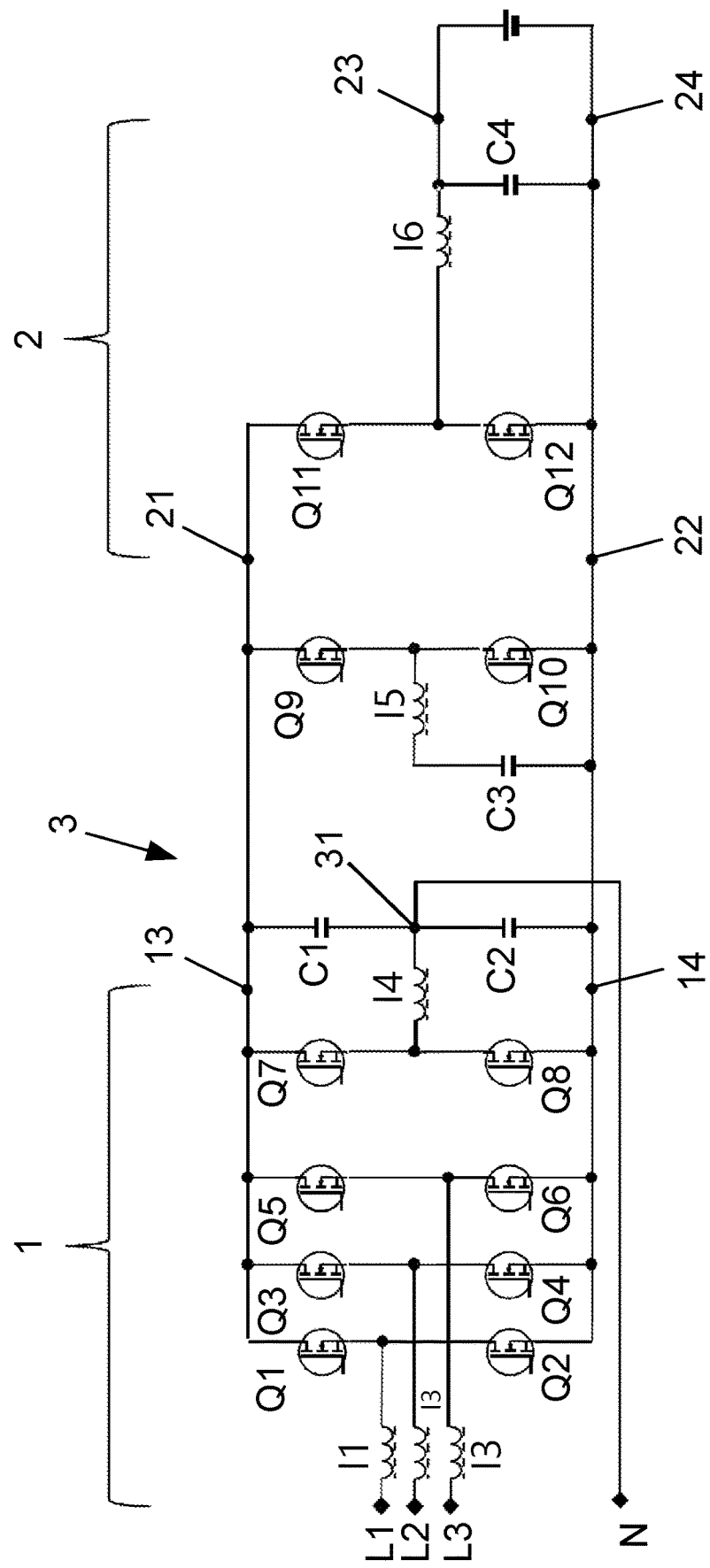
FIG. 1a shows a power converter, in which the first power converter valve half-bridge and the second power converter valve half-bridge are formed by power converter valves outside a first power converter stage, and in which the second power converter stage is formed by a synchronous converter including one power converter valve half-bridge.

The principles of a power converter according to the invention are now explained on the basis of the power converter from FIG. 1a. The power converter according to the invention according to FIG. 1a, like the power converters in the other figures, is a bidirectional three-phase alternating current rectifier, which includes a three-phase alternating current input and output L1, L2, L3, N having outer conductor connections L1, L2, L3 and a neutral conductor connection N, a first power converter stage 1, an intermediate circuit 3, which comprises a capacitor half-bridge C1, C2, a second power converter stage 2 and a direct current output 23, 24

A first input and output of first power converter stage 1 of the power converter from FIG. 1a is connected to outer conductor connections L1, L2, L3 of three-phase alternating current input and output L1, L2, L3, N via an inductor 11, 12, 13 in each case (like the inputs of first power converter stages 1 of the power converter from FIGS. 1b through 4b). This three-phase alternating current input and output L1, L2, L3, N may be connected not only to a three-phase alternating current grid. With the aid of three-phase alternating current input and output L1, L2, L3, N, the power converter may also be connected to a two-phase alternating current grid or to a single-phase alternating current grid and be operated on these grids.

A second input and output 13, 14 of first power converter stage 1 is connected to intermediate circuit 3 (like outputs 13, 14 of first power converter stages 1 of the power converter from FIGS. 1b through 5b). The intermediate circuit of the power converter is also connected to first input and output 21, 22 of second power converter stage 2, whose second input and output 23, 24 forms the second input and output of the power converter.

First power converter stage 1 is formed by a controlled six-pulse bridge circuit made up of controllable power converter valves Q1, Q2, Q3, Q4, Q5, Q6 arranged in half-bridges Q1, Q2; Q3, Q4; Q5, Q6. A controller for controlling power converter valves Q1, Q2, Q3, Q4, Q5, Q6 is preferably provided but not illustrated. Connecting points between power converter valves Q1, Q2, Q3, Q4, Q5, Q6 of a half-bridge Q1, Q2; Q3, Q4; Q5, Q6 are connected to outer conductor connections L1, L2, L3 via the first input and output of first power converter stage 1 and inductors 11, 12, 13. Connections outside half-bridges Q1, Q2; Q3, Q4; Q5, Q6 are connected to connections 13, 14 of first power converter stage 1.

Capacitor half-bridge C1, C2 is connected to first connection 13 of second input and output 13, 14 of first power converter stage 1 and to first connection 21 of first input and output 21, 22 of second power converter stage 2, on the one hand, and to second connection 14 of output 13, 14 of first power converter stage 1 and to second connection 22 of first input and output 21, 22 of second power converter stage 2, on the other hand. A connecting point 31 between the two capacitors C1, C2 is connected to neutral conductor connection N.

During an operation of the power converter on a single-phase alternating current source or on a two-phase alternating current source, undesirable leakage currents may occur in a device connected to the power converter if the voltage over first capacitor C1 and the voltage over second capacitor C2 are not the same.

A voltage present between connecting point 31 of the capacitor half-bridge and neutral conductor N, on the one hand, and second connection 14 of the output of first power converter stage 1 and second connection 22 of the output of second power converter 2, on the other hand, is stabilized by the first power converter valve half-bridge.

In the power converter from FIG. 1a, the first power converter valve half-bridge is formed by power converters Q7, Q8. The connecting point between the two power converters Q7, Q8 is connected to connecting point 31 of capacitor half-bridge C1, C2 and neutral conductor connection N via a an inductor 14. Connections outside power converter valve half-bridge Q7, Q8 are connected to first connection 13 of second input and output 13, 14 of first power converter stage 1 and to first connection 21 of first input and output 21, 22 of second power converter stage 2, on the one hand, and to second connection 14 of second input and output 13, 14 of first power converter stage 1 and to second connection 22 of first input and output 21, 22 of second power converter stage 2, on the other hand.

By alternately closing and opening power converter valves Q7, Q8 of first power converter valve half-bridge Q7, Q8 with a variable pulse duty factor, the voltage between connecting point 31 and first connection 13 of output 13, 14, which falls over capacitor C2, may be set. Power converter valves Q7, Q8 of first power converter valve half-bridge Q7, Q8 are opened and closed in such a way that the voltage over first capacitor C1 and second capacitor C2 is the same, or at least the voltage over C2 is constant as much as possible. Leakage currents may be avoided thereby.

A voltage falling over capacitor half-bridge C1, C2, i.e., at second input and output 13, 14 of first power converter stage 1 and at first input and output 21, 22 of second power converter stage 2, may be stabilized with the aid of an active filter for the purpose of avoiding voltage ripples. The active filter is formed by the second power converter valve half-bridge comprising power converter valves Q9, Q10 and the series circuit made up of third capacitor C3 and inductor 15. Connections outside the power converter valve half-bridge are connected to first connection 13 of second input and output 13, 14 of first power converter stage 1 and to first connection 21 of first input and output 21, 22 of second power converter stage 2, on the one hand, and to second connection 14 of second input and output 13, 14 of first power converter stage 1 and to second connection 22 of 1 first input and output 21, 22 of second power converter stage 2, on the other hand. A connecting point between the two power converter valves Q9, Q10 is connected to second connection 14 of second input and output 13, 14 of first power converter stage 1 via series circuit C3, 15 and to second connection 22 of first input and output 21, 22 of second power converter stage 2. By closing and opening power converter valves Q9, Q10, the voltage over the second power converter valve half-bridge, and thus the voltage over second input and output 13, 14 of first power converter stage 1 and over first input and output 21, 22 of second power converter stage 2, may be set. For this purpose, capacitor C3 and inductor 15 may be charged while power converter valve Q9 is open and power converter valve Q10 is closed and discharged while power converter valve Q9 is closed and power converter valve Q10 is open. Voltage ripples may be prevented or at least mitigated thereby.

Second power converter stage 2 is formed by a DC-DC converter, namely by a first synchronous converter. Its power converter valve half-bridge made up of two power converter valves Q11 and Q12 is connected by its outer connections to first input and output 21, 22 of second power converter 2. A connecting point between power converter valves Q11 and Q12 and second connection 22 of the first input and output are connected to second input and output 23, 24 via a low pass made up of an inductor 16 and a capacitor C4.

Figure 2A:
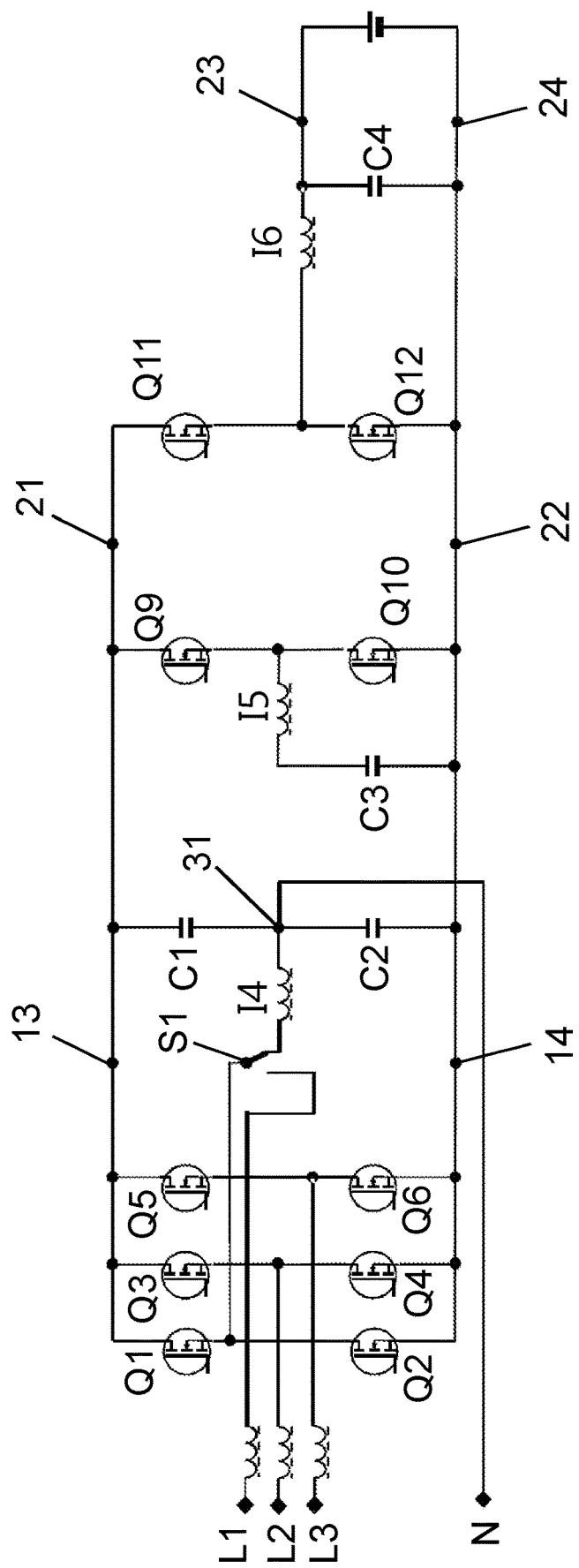
FIG. 2a shows a power converter, in which the first power converter valve half-bridge is formed by a power converter valve half-bridge of the first power converter stage, and the second power converter valve half-bridge is formed by power converter valves outside a first power converter stage, and in which the second power converter stage is formed by a synchronous converter including one power converter valve half-bridge.
Figure 2B:
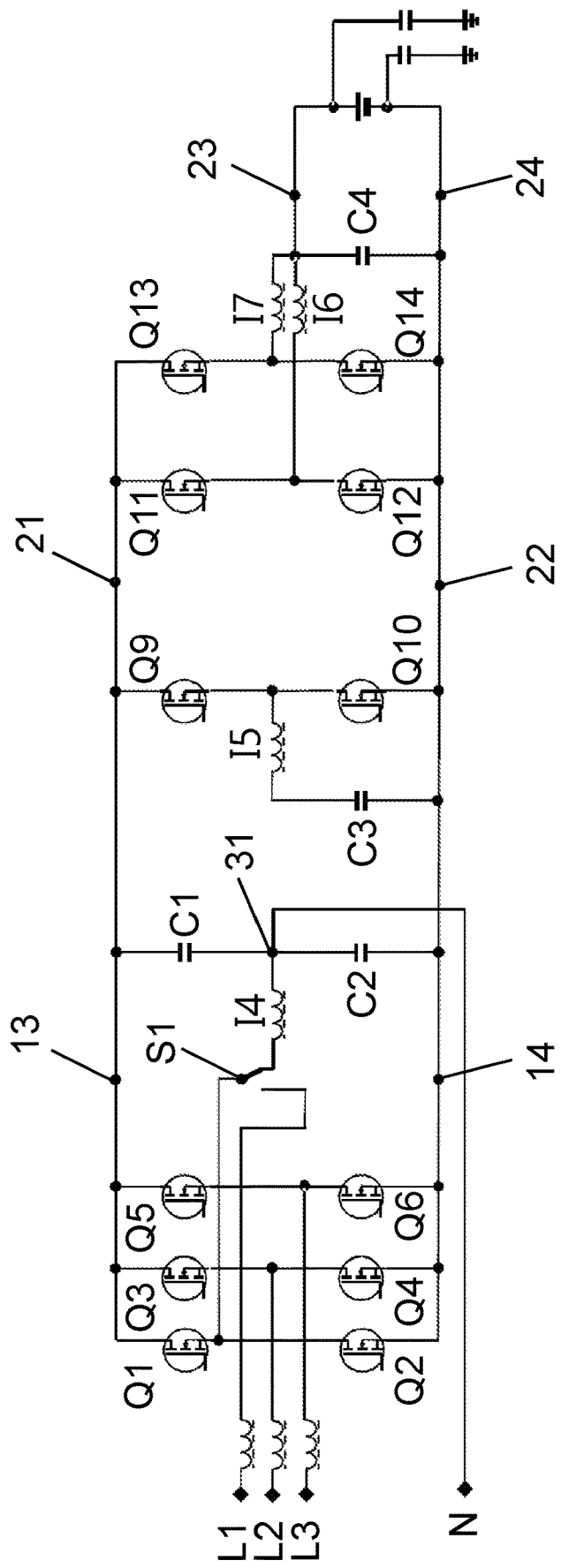
FIG. 2b shows a variant of the power converter from FIG. 2a, in which, in contrast to the power converter from FIG. 2a, the second power converter stage is formed by a synchronous converter including two power converter valve half-bridges.
Figure 2C:
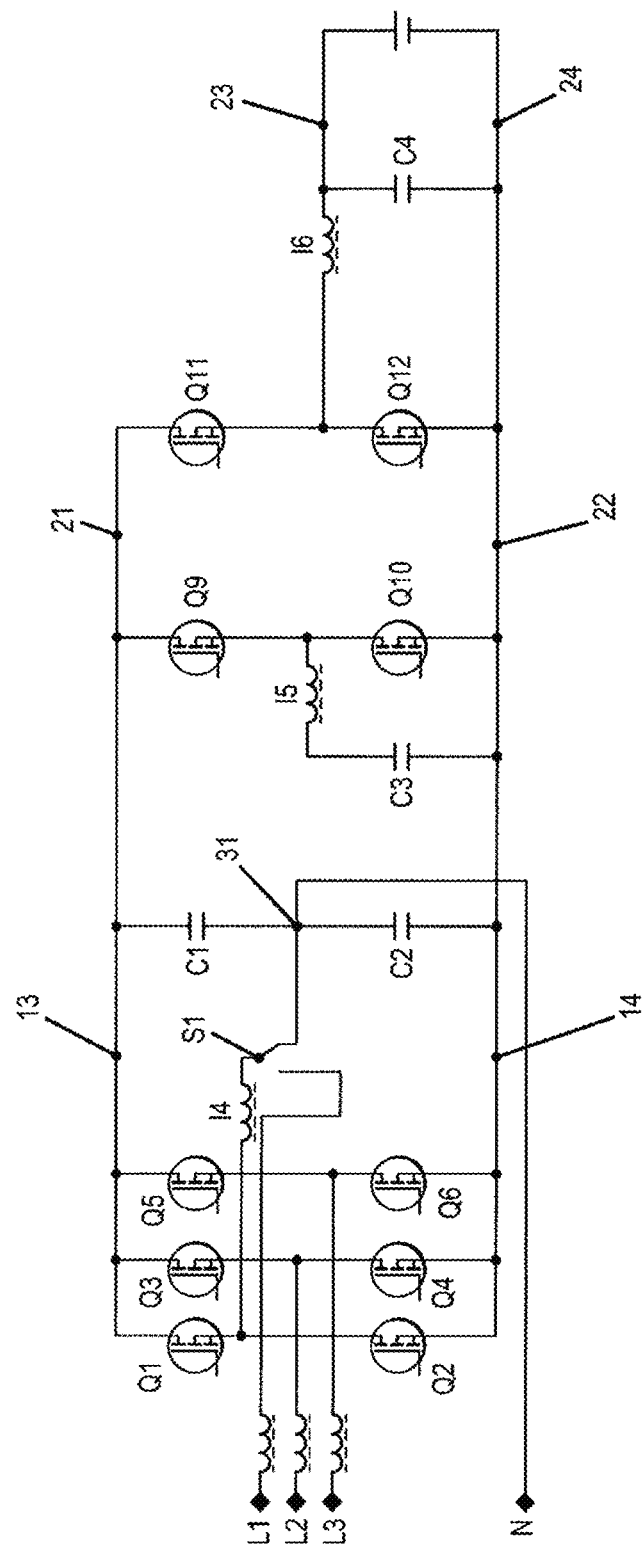
FIG. 2c shows a variant of the power converter from FIG. 2a, in which, a first switch is a changeover switch, whose shared middle connection is connected to the connecting point of the first power converter valve half-bridge via the first throttle and which, depending on the switch position, is connected to either the connecting point of the capacitor half-bridge or a first outer conductor connection of the three-phase alternating current input and output.

The power converter illustrated in FIG. 2a differs from the power converter illustrated in FIG. 1a in that the first power converter valve half-bridge is not formed by components outside first power converter stage 1, but rather by a first of power converter valve half-bridges Q1, Q2 of controlled six-pulse bridge circuit Q1, Q2, Q3, Q4, Q5, Q6, which is connected to first outer conductor connection L1 of three-phase alternating current input and output L1, L2, L3, N in the case of three-phase supply. Unlike the power converter from FIG. 1a, the connecting point of power converter valve half-bridge Q1, Q2 is not connected directly to outer conductor connection L1 via an inductor. The connecting point is connected to a shared middle connection of a changeover switch S1. Depending on the control of changeover switch S1, a connection may be established from this middle connection to outer conductor connection L1, or a connection may be established via inductor 14 to connecting point 31 in the capacitor bridge circuit. In the case of a connection to outer conductor connection L1, power converter valves Q1, Q2 may be used for connection to a three-phase current source. In the case of a connection to inductor 14, the power converter valves (in a single-phase or two-phase connection to a power source) may be used to stabilize the voltage between connecting point 31 or neutral conductor connection N and second connection 14 of second input and output 13, 14 of first power converter stage 1 and second connection 22 of first input and output 21, 22 of second power converter stage 2.

Figure 3A:
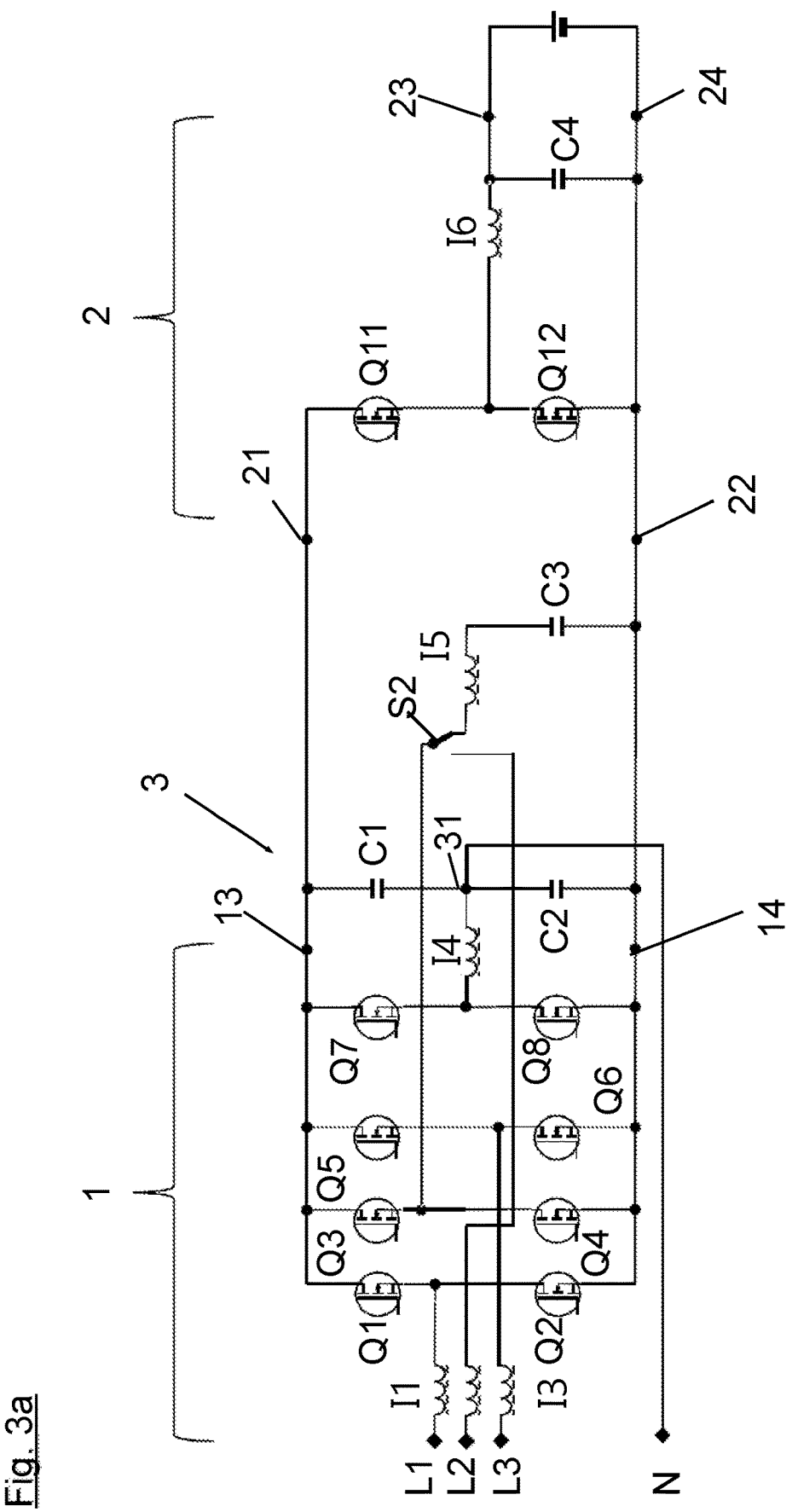
FIG. 3a shows a power converter, in which the first power converter valve half-bridge is formed by power converter valves outside a first power converter stage, and the second power converter valve half-bridge is formed by a power converter valve half-bridge of the first power converter stage, and in which the second power converter stage is formed by a synchronous converter including one power converter valve half-bridge.
Figure 3B:
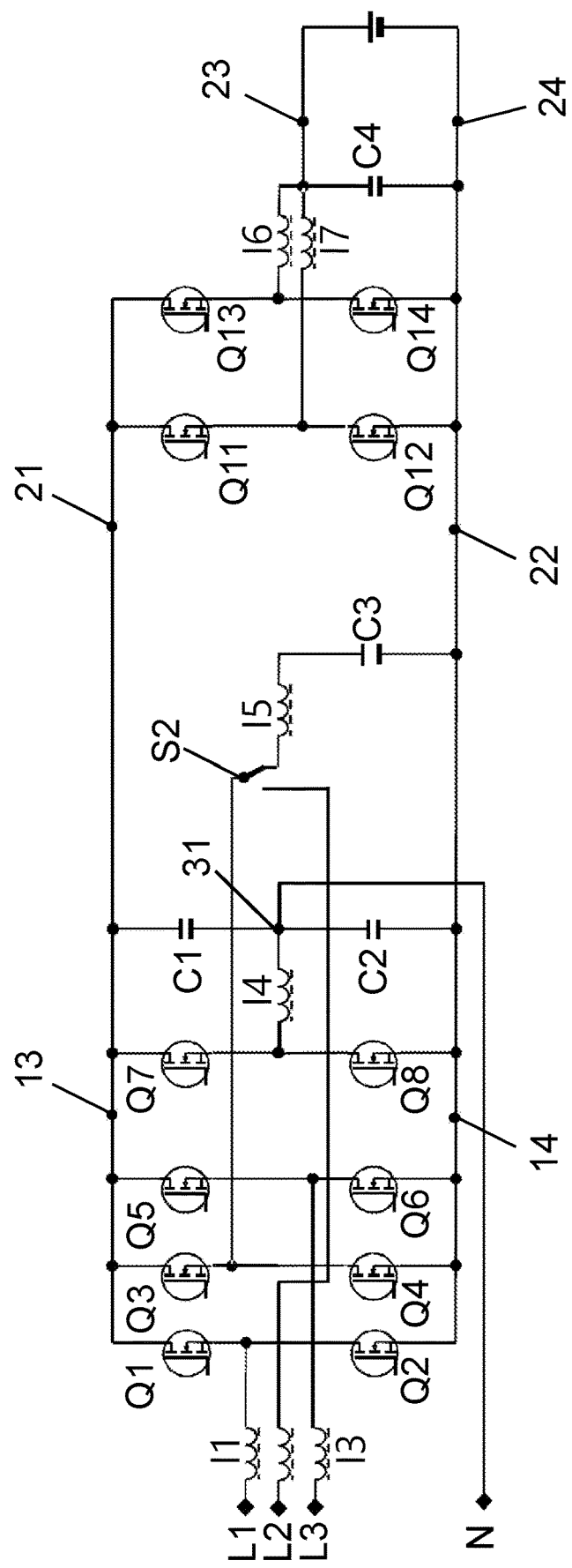
FIG. 3b shows a variant of the power converter from FIG. 3a, in which, in contrast to the power converter from FIG. 3a, the second power converter stage is formed by a synchronous converter including two power converter valve half-bridges.
Figure 3C:
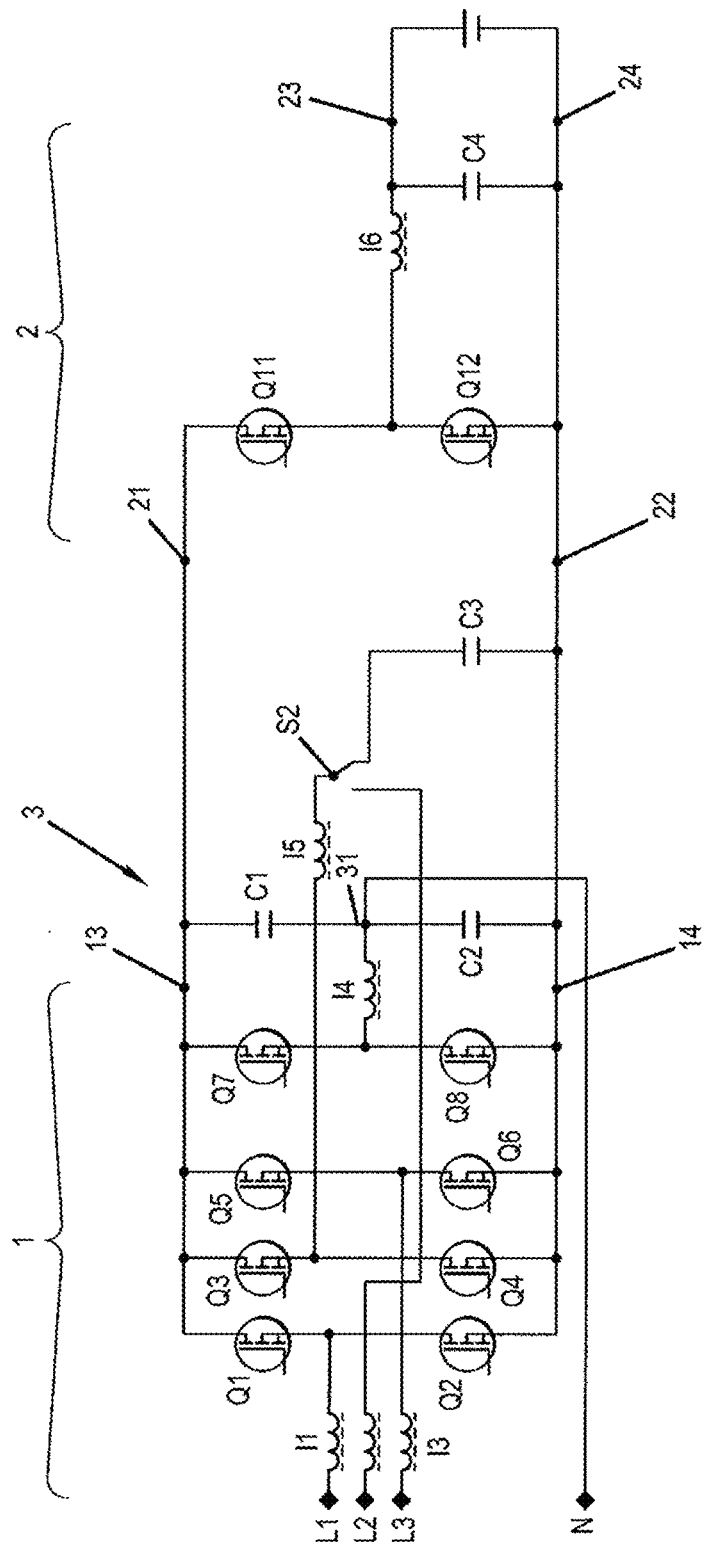
FIG. 3c shows a variant of the power converter from FIG. 2a, in which, a second switch is a changeover switch, whose shared middle connection is connected to the connecting point of the second power converter valve half-bridge via the second throttle and which, depending on the switch position, is connected to either the third capacitor or a second outer conductor connection of the three-phase alternating current input and output.

The power converter illustrated in FIG. 3a differs from the power converter illustrated in FIG. 1a in that the second power converter valve half-bridge is not formed by components outside first power converter stage 1, but rather by a second of power converter valve half-bridges Q3, Q4 of controlled six-pulse bridge circuit Q1, Q2, Q3, Q4, Q5, Q6, which is connected to second outer conductor connection L2 of three-phase alternating current input and output L1, L2, L3, N in the case of three-phase supply. Unlike the power converter from FIG. 1a, the connecting point of power converter valve half-bridge Q1, Q2 is not connected directly to outer conductor connection L2 via a throttle an inductor. The connecting point is connected to a shared middle connection of a changeover switch S2. Depending on the control of changeover switch S2, a connection may be established from this middle connection to outer conductor connection L2 or, a connection may be established via the series circuit of inductor 15 and capacitor C3 to second connection 14 of second input and output 13, 14 of first power converter stage 1 and to second connection 22 of first input and output 21, 22 of second power converter stage 2. In the case of a connection to outer conductor connection L2, power converter valves Q1, Q2 may be used for connection to a three-phase or two-phase current source. If connected to series circuit 15, C3, the power converter valves (with a single-phase connection to a power source) may be used to stabilize the voltage between first connection 13 of second input and output 13, 14 of first power converter stage 1 and first connection 21 of first input and output 21, 22 of second power converter stage 2, on the one hand, and to second connection 14 of second input and output 13, 14 of first power converter stage 1 and second connection 22 of first input and output 21, 22 of second power converter stage 2, on the other hand.

Figure 4A:
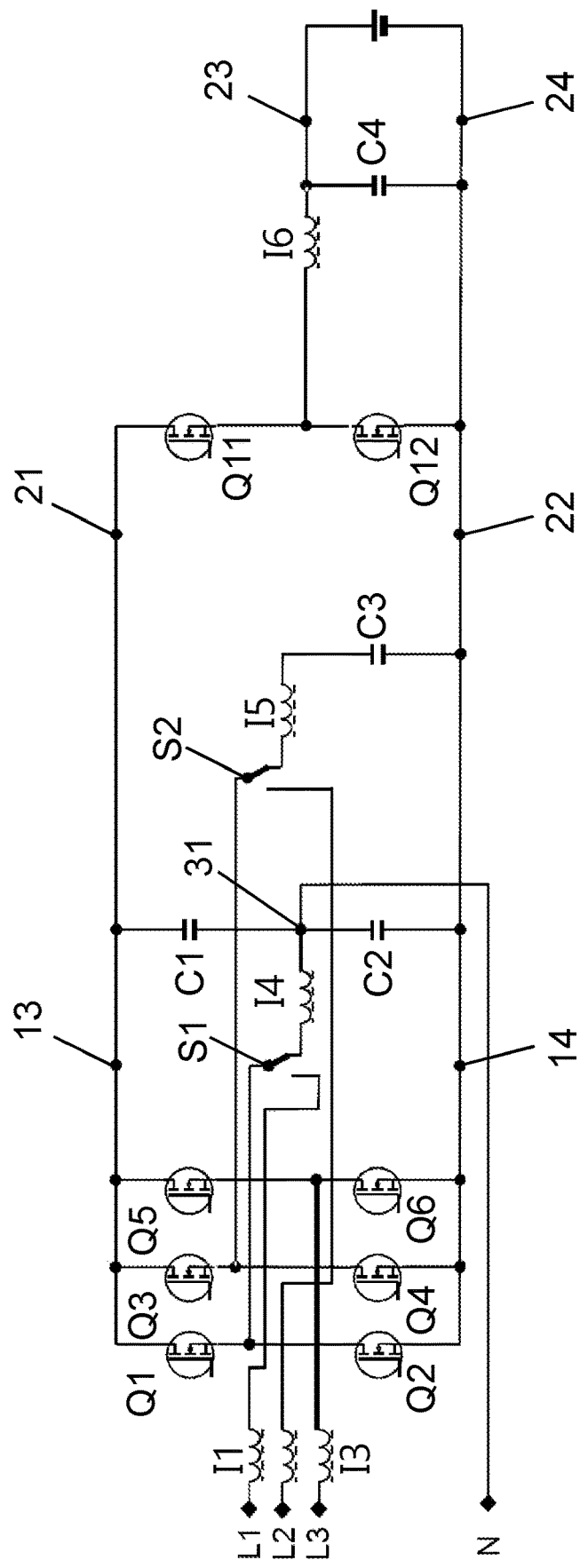
FIG. 4a shows a power converter, in which the first power converter valve half-bridge and the second power converter valve half-bridge are formed by a power converter valve half-bridge of the first power converter stage, and in which the second power converter stage is formed by a synchronous converter including one power converter valve half-bridge.
Figure 4B:
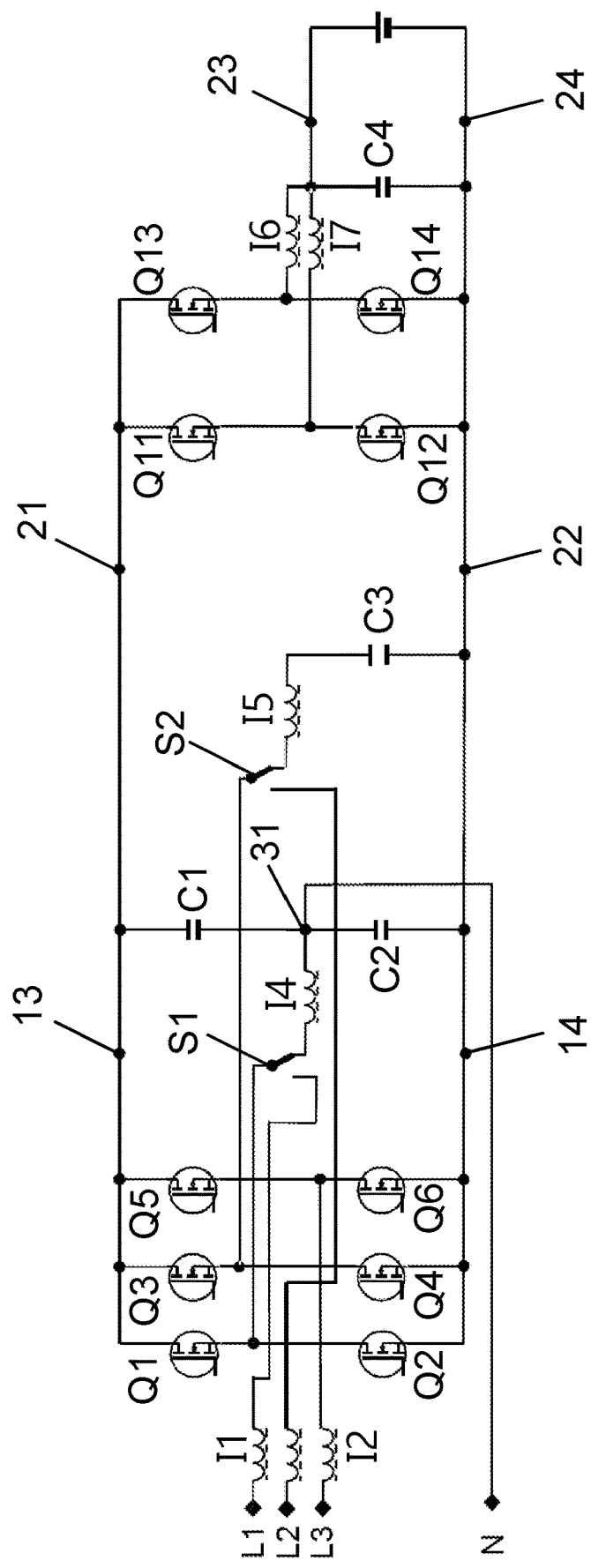
FIG. 4b shows a variant of the power converter from FIG. 4a, in which, in contrast to the power converter from FIG. 4a, the second power converter stage is formed by a synchronous converter including two power converter valve half-bridges.

In the case of the power converter illustrated in FIG. 4a, both first power converter valve half-bridge Q1, Q2 and second power converter valve half-bridge Q3, Q4 are used to stabilize the voltage over capacitor C2 or the voltage in intermediate circuit 3 in the case of a single-or two-phase supply of the power converter. For this purpose, first power converter valve half-bridge Q1, Q2 and second power converter valve half-bridge Q3, Q4 may be connected via changeover switches S1 and S2 either to outer conductor connections L1, L2, on the one hand, or to inductor 14 or the series circuit made up of inductor 15 and capacitor C3, on the other hand, as is possible in the case of the converter from FIG. 2a or from FIG. 3a.

Figure 5A:
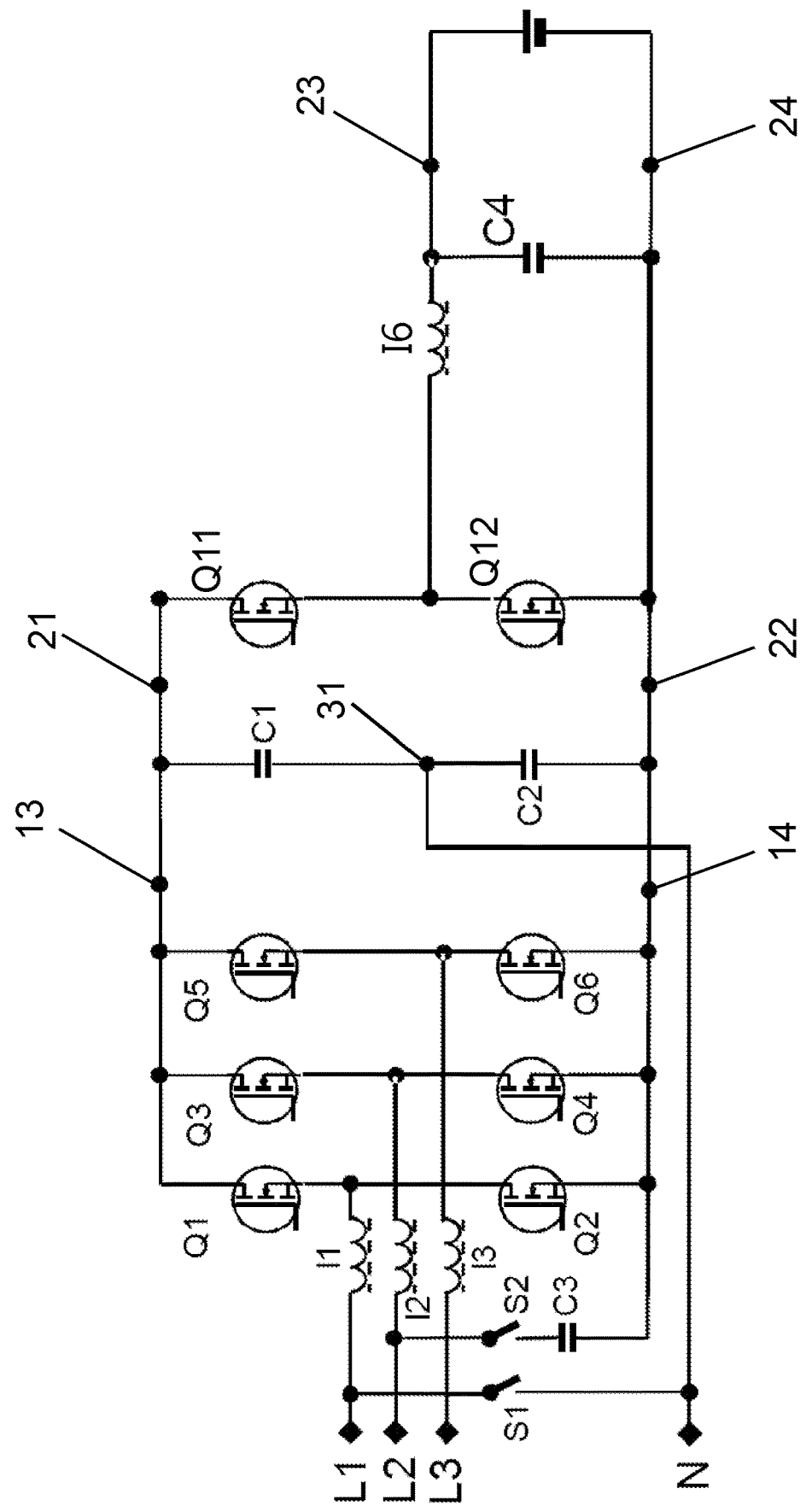
Figure 5B:
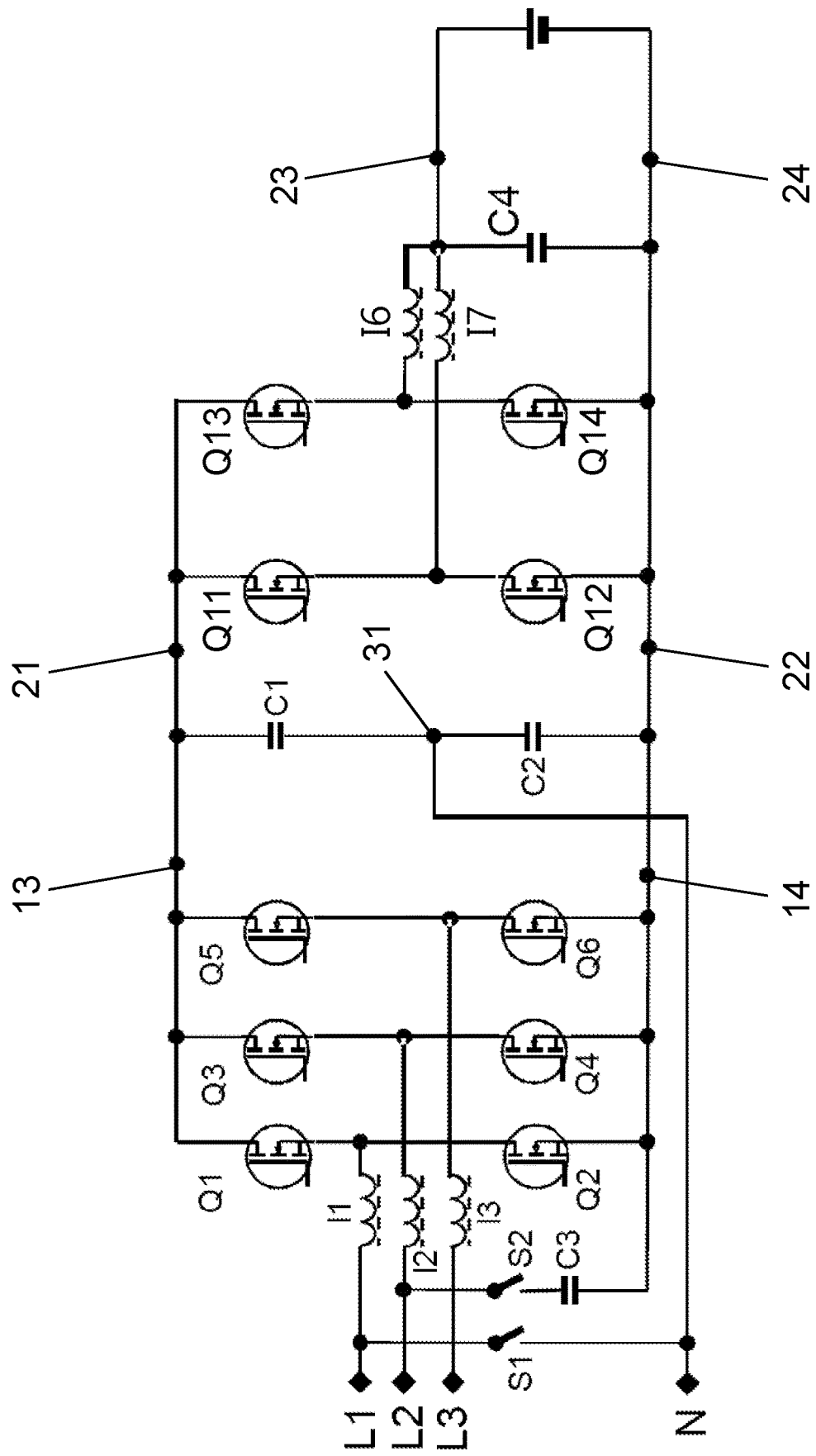
FIG. 5b shows a variant of the power converter from FIG. 4b.

The power converter illustrated in FIG. 5a differs from the power converter illustrated in FIG. 4a in that the number of components used is further reduced. This is possible in that changeover switches S1, S2 are replaced by on and off switches S1, S2, and the connection of switches S1, S2 to the connecting points between power converter valves Q1, Q2 or Q3, Q4 was changed. In the case of the power converter from FIG. 5a, these connecting points are connected to switches S1, S2 via inductors 11, 12.

With switch S1 closed, a connection is then established from the connecting point between power converter valves Q1, Q2 via inductor 11 to neutral conductor connection N or to connecting point 31. Inductor 11 takes on the function of throttle inductor 14 of the power converters from FIGS. 1a, 2a, 3a and 4a. Power converter valves Q1, Q2 are switched in single-or two-phase alternating current mode in such a way that the voltage at capacitor C2 of capacitor half-bridge C1, C2 is constant as far as possible. This is the case when the current through inductor 11 is the inverse of the current through inductor 13.

With switch S2 closed, a connection is established to capacitor C3, so that a connection exists from the connecting point between power converter valves Q3, Q4 via inductor 12 and the capacitor to second connection 14 of second input and output 13, 14 of first power converter stage 1 and to second connection 22 of first input and output 21, 22 of second power converter stage 2. Inductor 12 takes on the function of inductor 15 of the power converters from FIGS. 1a, 2a, 3a and 4a.

Figure 1B:
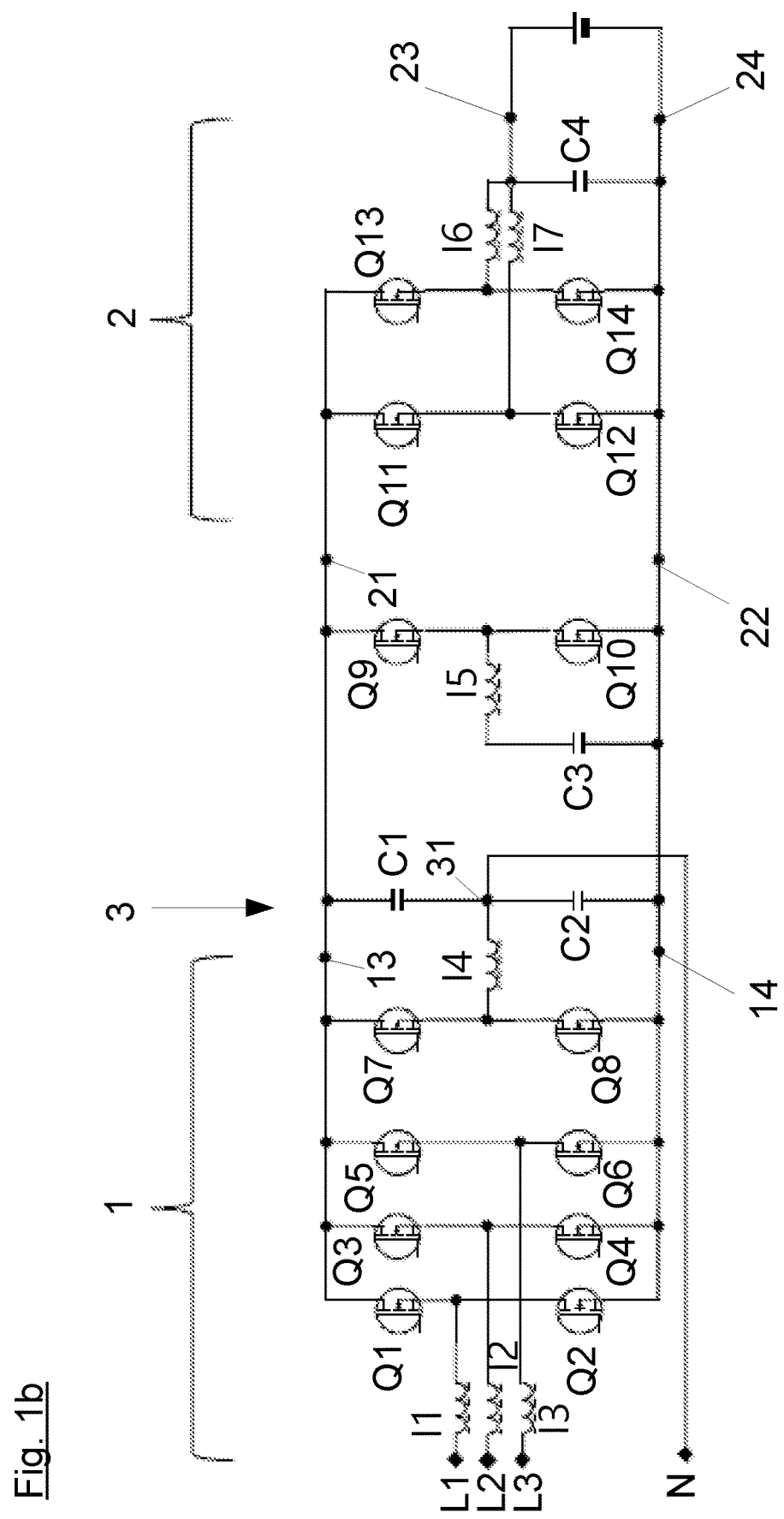
FIG. 1b shows a variant of the power converter from FIG. 1a, in which, in contrast to the power converter from FIG. 1a, the second power converter stage is formed by a synchronous converter including two power converter valve half-bridges.

The power converter from FIG. 1b differs from the power converter from FIG. 1a in that second power converter stage 2 has, in addition to the first synchronous converter, which is already provided in the second power converter stage of the power converter according to FIG. 1a, a second synchronous converter connected in parallel to the first. This second synchronous converter has two power converter valves Q13, Q14 in a half-bridge arrangement and an inductor 16, which is connected to the connecting point between power converter valves Q13, Q14 and capacitor C4, which is used by both synchronous rectifiers. In the same way, the power converters according to FIGS. 2b, 2c, 3b, 3c, 4b and 5b also differ from the power converters illustrated in FIGS. 2a, 3a, 4a and 5a.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for rectifying two-phase current from a two-phase alternating current source with the aid of a bidirectional power converter:

wherein the bidirectional power converter comprises:
    a first power converter valve half-bridge comprising two controlled power converter valves;
    an intermediate circuit;
    a three-phase alternating current input and output;
    a first power converter stage having a first input/output and a second input/output; and
    a second power converter stage having a first input/output and a second input/output and a direct current input/output,
wherein the first input/output of the first power converter stage is electrically connected to the three-phase alternating current input/output,
wherein the second input/output of the first power converter stage is electrically connected to the intermediate circuit,
wherein the first input/output of the second power converter stage is electrically connected to the intermediate circuit,
wherein the second input/output of the second power converter stage is electrically connected to the direct current output,
wherein the first power converter stage comprises a controlled six-pulse bridge circuit comprising six controllable power converter valves arranged in three half-bridges, including inductors between the three-phase alternating current inputs and the bridge center points of the half-bridges,
wherein the intermediate circuit includes a capacitor half-bridge comprising a first capacitor and a second capacitor, wherein the first capacitor is connected to a first connection of the second input/output of the first power converter stage and a first connection of the first input/output of the second power converter stage and to the second capacitor, wherein the second capacitor is connected to a second connection of the second input/output of the first power converter stage and a second connection of the first input/output of the second power converter stage and to the first capacitor, wherein a connecting point between the first capacitor and the second capacitor is connected to a neutral conductor connection of the three-phase alternating current input/output, wherein the first power converter valve half-bridge comprising the two controlled power converter valves is connected to the first connection and the second connection of the second input/output of the first power converter stage, and whose connecting point between the power converter valves of the first power converter valve half-bridge is connected to the connecting point of the capacitor half-bridge via a first inductor, wherein the bidirectional power converter does not include a transformer, wherein the first power converter valve half-bridge is formed by a first of the half-bridges of the controlled six-pulse bridge circuit, wherein the first power converter stage includes a first switch, and wherein the method comprises:
connecting the power converter to the two-phase alternating current source via a second outer conductor and a third outer conductor connection of the three-phase alternating current input/output, the first switch being in the switch position, in which a conductive connection exists from the connecting point of the first power converter valve half-bridge to the connecting point of the capacitor half-bridge via the first inductor; and
controlling the first power converter stage so that the power converter valves of the first power converter valve half-bridge regulate a voltage over the first and/or second capacitor of the capacitor half-bridge.

2. A method for rectifying single-phase current from a single-phase alternating current grid or for inverting direct current from a direct current grid with the aid of a bidirectional power converter:
wherein the bidirectional power converter comprises:
a first power converter valve half-bridge comprising two controlled power converter valves;
an intermediate circuit;
a three-phase alternating current input and output;
a first power converter stage having a first input/output and a second input/output; and
a second power converter stage having a first input/output and a second input/output and a direct current input/output,
wherein the first input/output of the first power converter stage is electrically connected to the three-phase alternating current input/output,
wherein the second input/output of the first power converter stage is electrically connected to the intermediate circuit,
wherein the first input/output of the second power converter stage is electrically connected to the intermediate circuit,
wherein the second input/output of the second power converter stage is electrically connected to the direct current output,
wherein the first power converter stage comprises a controlled six-pulse bridge circuit comprising six controllable power converter valves arranged in three half-bridges, including inductors between the three-phase alternating current inputs and the bridge center points of the half-bridges,
wherein the intermediate circuit includes a capacitor half-bridge comprising a first capacitor and a second capacitor,
wherein the first capacitor is connected to a first connection of the second input/output of the first power converter stage and a first connection of the first input/output of the second power converter stage and to the second capacitor,
wherein the second capacitor is connected to a second connection of the second input/output of the first power converter stage and a second connection of the first input/output of the second power converter stage and to the first capacitor,
wherein a connecting point between the first capacitor and the second capacitor is connected to a neutral conductor connection of the three-phase alternating current input/output,
wherein the first power converter valve half-bridge comprising the two controlled power converter valves is connected to the first connection and the second connection of the second input/output of the first power converter stage, and whose connecting point between the power converter valves of the first power converter valve half-bridge is connected to the connecting point of the capacitor half-bridge via a first inductor,
wherein the bidirectional power converter does not include a transformer,
wherein the first power converter valve half-bridge is formed by a first of the half-bridges of the controlled six-pulse bridge circuit,
wherein the first power converter stage includes a first switch,
wherein the method comprises:
connecting the power converter to the single-phase alternating current grid via a third outer conductor connection of the three-phase alternating current input/output, the first switch being in the switch position, in which a conductive connection exists from the connecting point of the first power converter valve half-bridge to the connecting point of the capacitor half-bridge via the first inductor; and
controlling the first power converter stage so that the power converter valves of the first power converter valve half-bridge regulate a voltage over the first and/or second capacitor of the capacitor half-bridge,
wherein the second switch is in the switch position, in which a conductive connection exists from the connecting point of a second power converter valve half-bridge to the second connection of the second input/output of the first power converter stage via a series circuit comprising the second inductor and a third capacitor, and
wherein, by controlling the first power converter stage, the power converter valves of the second power converter valve half-bridge regulate a voltage over the capacitor half-bridge.

3. The method according to claim 2, wherein the second power converter valve half-bridge is operated as an active ripple filter, using the third capacitor as a storage capacitor.

\* \* \* \* \*